Dec. 14, 1971  G. HANSEN  3,626,589
DEVICE FOR THE REMOVAL OF CONTAINERS OF
THERMOPLASTIC SYNTHETIC MATERIAL
Filed Nov. 25, 1969  4 Sheets-Sheet 1

INVENTOR.
Gerhard Hansen
BY
Watson, Cole, Grindle, Watson
Attys.

INVENTOR.
Gerhard Hansen
BY
Watson, Cole, Grindle & Watson
Attys.

United States Patent Office 3,626,589
Patented Dec. 14, 1971

3,626,589
DEVICE FOR THE REMOVAL OF CONTAINERS OF THERMOPLASTIC SYNTHETIC MATERIAL
Gerhard Hansen, Hofener Strasse 47, D 7013 Offingen, Kreis Waiblingen, Germany
Filed Nov. 25, 1969, Ser. No. 879,722
Claims priority application Germany, Dec. 6, 1968,
P 18 13 048.8
Int. Cl. B29d 23/03
U.S. Cl. 425—307
12 Claims

ABSTRACT OF THE DISCLOSURE

The invention concerns a device for the removal, out of a production mold of thermoplastic containers produced by a blow molding process, and for the removal of the waste material from the containers. The device has a discharge device having a unit acting on one side on the container located in the production mould and a guide member which brings the container in a position tilted against its production onto a conveyor track. A side displacement device having a stop member for the container is provided in front of a separating device. The unit acting on one side on the container located in the production mould has at least one projection on the wall part of the half mould adjacent the conveyor track and a drivable displacement roller arranged substantially at the point of separation of the half mould. A stripper serves to remove any container still in the mould. The lateral displacement device has U-shaped stop members for the alignment of the container, before it is displaced into the separating device wherein spiral shaped projections of a pair of separating rollers grip onto the waste parts and remove them from the container. The bottles are then pushed away to the side by the lateral displacement device.

This invention relates to a device for the removal, from a production mold of thermoplastic containers produced by a blow molding method, and for the removal of waste material located on the containers, the device having a discharge device, a conveyor device and a separating device.

In a container produced from thermoplastic tubing of the soft deformable type, waste parts, so-called clots lying on the outside of the production mould and originating at the end of the production process, are normally removed by hand.

The object of the invention is to provide a device which automatically operates for safely removing the containers from each of production mold half-sections moving along a circle, and for the removal of waste parts on the containers produced in these moulds. This object is obtained according to the invention in that the discharge means of the device is provided with a member acting on one side of the container located in the production mould and a guide member which brings the container in a position inclined to its production position onto a conveyor belt. Moreover, a lateral displacement device having a stop for the container is provided in front of the separating device.

In order to bring a device for the removal of waste parts from the container into connection with the container production moulds, a guide device is needed to insure that the containers are in each case discharged out of a given half mould while the other half mould continued on its way empty. Furthermore a branch position in the form of a lateral displacement device is necessary which only passes containers to the separating device when these containers fulfill the requirements, while other containers or the half shaped or unshaped tube, particularly on the approach of the machine, must be carried past the separating device. The separating device must, furthermore, be driven in a work cycle which causes the discharge of the containers from the machine to correspond with their production, for which purpose a form of locking drive is provided between this machine and the separating device. The guide device consequently serves for the safe removal of the container from the half mould and further serves to transport it in the correct position into the separating device while, on approaching the machine, the first waste containers produced are taken by means of the inactive lateral displacement device past the separating device.

In a further development of the invention, the member acting on one side on the container located in the production mould has at least one projection on at least one wall portion having at least one horizontal component, when the mould is closed, towards each of the mold halves on the moulds adjacent the conveyor track and a displacement roller drivable by a driving device for the production moulds and arranged substantially at the point of separation of the half moulds. The projection, preferably arranged on the base, prevents the container being carried along by the other half of the mould and the displacement roller ensures that the container remains in the half mould desired if, due to an irregular shape of the bottle, the projection is not sufficient. When necessary, and particularly with bottles having a very stiff neck, a further projection is provided at the shoulder; both projections being designed to accommodate the shrinking of the bottle on cooling so that the bottle only adheres slightly. In this manner, a sure deposit of the bottle at the desired position is obtained.

It can happen that a container adheres to the half mould even when this has passed its lowest position. In order to prevent this, a scraper, which preferably resiliently engages by rotation in the track of any container still present in the half moulds, is provided substantially at the location wherein the half mould adjacent the conveyor belt begins to rise. In order to not subject the container to undue stress on removal of the waste parts generally present at the head and base thereof and to obtain easy stripping of these waste parts, the separating device has a pair of separating rollers receiving the waste parts between them and a circumferential movement facing away from the container, of which each roller is provided on its outer periphery with a spiral shaped projection, the spiral projections being designed in mirror image but otherwise similar and co-operating. The two co-operating spiral shaped projections in general only affect the waste part at one point and not over the entire width of the bottles so that the waste part can be easily stripped across the bottle.

The invention further provides that the lateral displacement device has U-shaped stop members each arranged in the direction of travel of the conveyor belt and, above the same substantially at the height of the separating rollers, the said U-shaped members are adapted to operate individually. The front member serves to stop the approaching container and the rear member serves to stop the container lying in front of the separating device. Also a pusher to push the container towards the separating rollers is provided. The lateral displacement device either allows the container, for example on starting up the machine, to pass through or, when at rest, pushes each time at least one of the containers into the separating device.

It is an advantage that each U-shaped stop member be connected by means of an entrainer to a pivotal lever operable by a work cylinder, and the two U-shaped stop members be likewise adapted to be operated by means of a hand lever operating a gear in each case via an entrainer and simultaneously. On moving up the machine the U-shaped stop members are raised manually and thereafter in the course of the stationary working are automatically raised by means of the work cylinder in the working cycle of the machine. In the event of a breakdown of the machine during operation, the U-shaped stop members may be lifted to free the passage of containers which are not satisfactory. In order to prevent the containers, when incorrectly positioned, from being pushed into the separating device and damaged, a signal emitter is provided on the front U-shaped stop member which merely gives an operating signal for the operation of the control appliance for the lateral displacement when the front U-shaped stop member has reached its operational position. Unnecessary stoppage of the machine due to damage of the containers by the lateral displacement device is thereby prevented.

Additional advantages and features will appear from the attached description in conjunction with the drawings. A device for the removal of containers of thermoplastic synthetic material from production moulds and for the removal of superfluous waste parts of the containers is shown schematically as an embodiment, by way of example only, of the subject matter of the invention, and in which.

Figure 1:
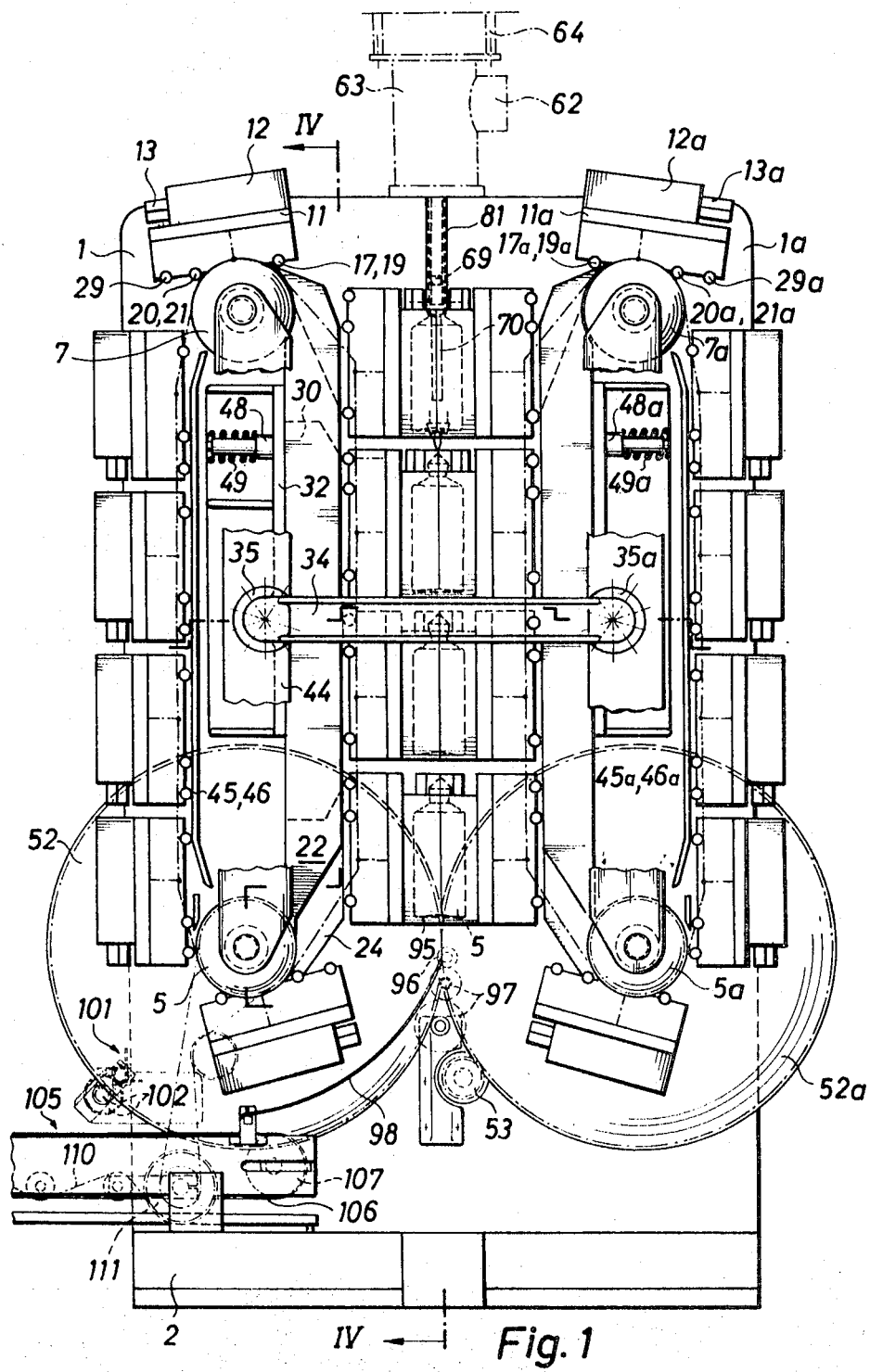
FIG. 1 shows a part of the device in front elevation.

A foot 2 is arranged on a holding plate 1 and serves to mount the holding plate 1 on a frame or pedestal. Chain wheels 7, 5 and 7a, 5a are arranged above and behind one another in pairs on bearing pins mounted on the plate 1. An endless chain runs over each of two chain wheels 5, 7 and 5a, 7a arranged above one another and over the chain wheels lying behind these and not visible in FIG. 1. The two chains on one side are connected together at the same distance apart by means of, for example, ten carrier plates 11 each of which carries a half mould 12 and a mould head piece 13 or 13a assigned to it which can be controlled by means of a wheel 29 carried on a separate rail.

The carrier plates 11 are displaceably mounted on rails 22 and 24 by means of wheels 17, 19, 20 and 21. The rails are arranged in each case in pairs, the rails 22 for the front wheels 17, 19 having a different width of track than the rails 24 for the rear wheels 20, 21. The parts used on the circular track shown on the right in FIG. 1 which correspond to the parts of the circular track shown on the left each have the same reference number to which a small letter a is added.

For the guidance of the wheels 17 and 19 to 21 on the side remote from the application rails 22 and 24 a travel plate 45, 46 is respectively provided. Each of the travel plates is provided with a peg axially displaceable in a displacement bearing 48 which is secured on a rail plate 32 mounted on the holding plate 1. A spring 49 yoked between the travel plate 45 or 46 on the one hand and the displacement bearing 48 on the other hand urges the travel plate 45 or 46 away from the rail plate 32. The springs 49 serve to tension the chains 9 and 10. A guide shell respectively connected to the chain wheels 5 and 7 in the region thereof serves to guide the front and rear wheels 17 and 19 to 21. The application rails 22 and 24 are so designed that the carrier plates 11 and 11a lie parallel to one another shortly before the half moulds 12 and 12a carried by them and related to one another are brought together, and are connected form locked together with their connection parts (not shown). The two half moulds are also moved apart in a parallel position. For this purpose the front wheels 17, 19 have a different track width than the rear wheels 20, 21.

The chain wheel 5 is to be driven by a gear wheel 52 which receives its drive from a pinion (not shown) mounted in the holding plate 1, which is driven on the rear side of the holding plate 1, via a direct variable gear by means of a motor. The gear wheel 52 meshes with a similarly designed gear wheel 52a which serves to drive the right hand circular track, which apart from slight exception, is designed in correspondence to the left hand circular track, springs being built-in on the one side between the mould plate and the rails to hold together the half-moulds.

An extruder head and a mandrel for the inflation and filling of the container are mounted on the holding plate 1 above the closed production moulds 12, 12a. Only one extruder head 63, an attachment collar 62 and two stand bolts 64 are shown in FIG. 1, which serve for the attachment of the inflation and filling mandrel which can be raised and lowered by means of work cylinders and has an openable valve at its mouth. A conical seating 69 is provided on the outer pipe of the mandrel. A filling pipe 70 is adapted to be displaced axially with play within the outer pipe. A valve rod carrying a valve member passes through the pipe 70. The valve rod and the valve member may be hollow for the feed of inflation gas, particularly compressed air or the like, and its channel may be monitored by a non-return valve mounted at its mouth and opening in the direction thereof. A plastic tube 81 is to be pressed out from the extruder head 63.

A peg 95 is provided in the base of each of the half moulds moving about chain wheels 5 and 7, each peg projecting into a suitable recess in the container produced in the mould. A displacement roller 96, slightly offset to the right, is mounted below the point of separation of the half moulds, and is rotatably mounted on a peg secured on the holding plate 1 and is adapted to be driven by means of a transmission gear 97 driven by means of a pinion mounted on the same shaft as the pinion 53. A metal slide plate 98 extends from the displacement roller 96 to the reverse point of the left hand half moulds which at its upper end is firmly connected to the holding plate 1 and lies loose on its lower end. In this way the metal slide plate 98 can yield resiliently in order to avoid malformations on bottles.

A stripper roller 101 is adapted to be driven from the gear wheel 52 via a gear 106. The stripper roller 101 has tangentially arranged resilient lamellae or thin plates past which curve the left hand half moulds which are led on rising and which come into contact with any container which may be carried along with a half mould so as to remove it therefrom.

Figure 2:
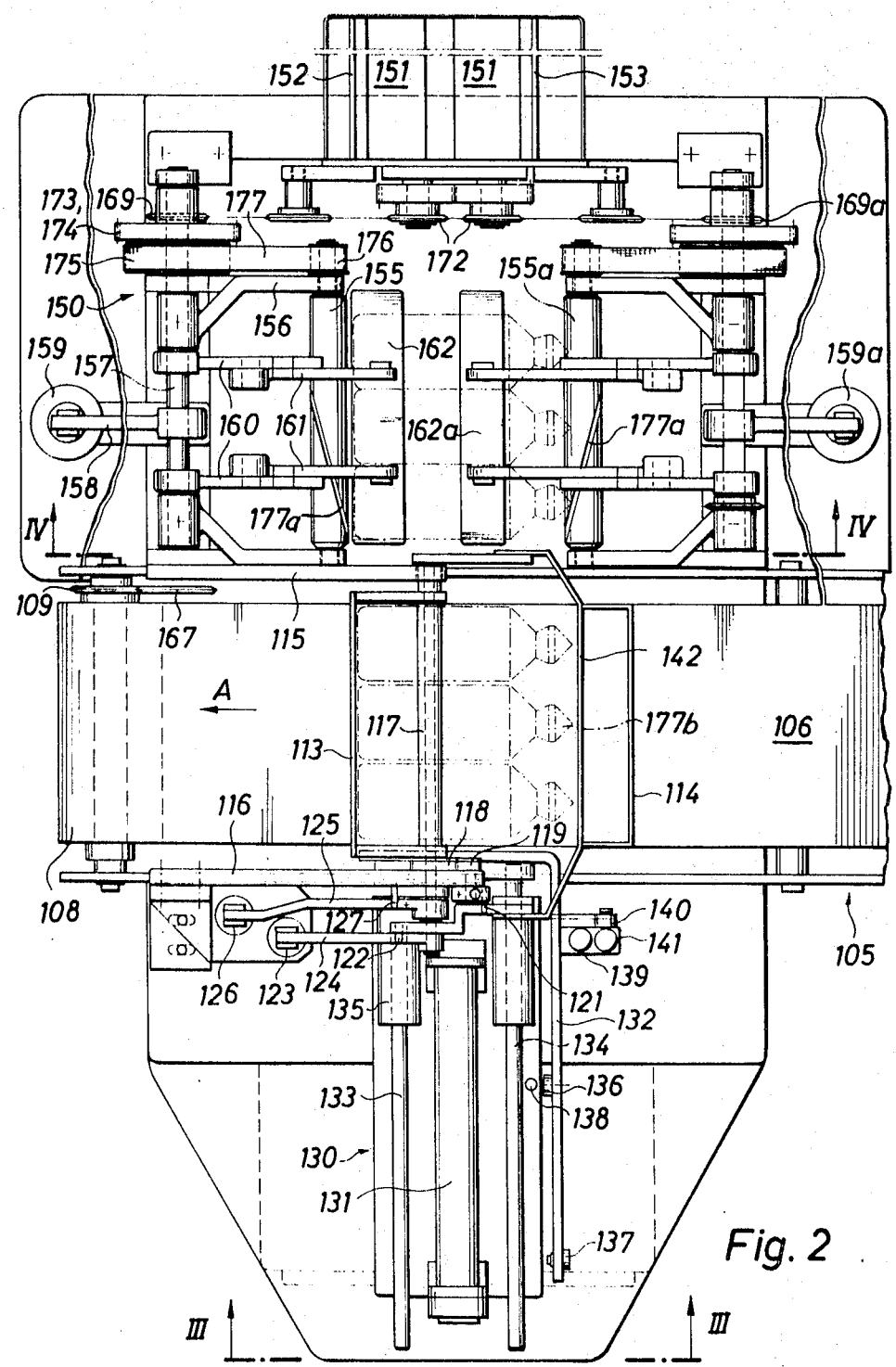
FIG. 2 is the other part of the machine attached to the part in FIG. 1, in top plan view and on another scale.

A belt conveyor 105 is provided below the gear wheel 52 the belt 106 of which is led at the side of the chain wheel 52 over a guide roller 10 and on the opposite side over a guide roller 108 (FIG. 2). The conveyor belt 106 is tensioned in the normal manner by means of tension rollers. The guide roller 108 is secured against rotation to a chain wheel 109 whose driving chains 110 are led over a chain tensioner which is driven by a chain wheel 111 driven from the chain wheel 5 by a chain.

In the direction of conveyance indicated by the arrow A a rear U-shaped stop member 113 and a front U-shaped stop member 114 are provided in front of the guide roller, each of which is individually adapted to pivot on a common axle which is mounted on U-shaped holders 115, 116 carrying bearings. The rear U-shaped stop member 113 is fixedly mounted on a bearing pipe 117 mounted in the U-shaped holding members 115 and 116. The bearing pipe is fixedly connected to a gear wheel 118 which meshes with a gear wheel 118 mounted on the U-shaped holding member 116, whose drive shaft is fixedly connected on the other side of the U-shaped holding member 116 to a hand lever 120 and a contact pin 121 engaging beneath the front U-shaped stop member 114. This carries a contact pin 122 on its side remote from the pin 121 and engages beneath an operating lever 124 lowerable by means of a work cylinder 123.

A work cylinder 126 connected to an operating lever 125 serves to operate the rear U-shaped stop member 113. The lever 125 is overlapped by a contact pin 127 which is fixedly connected to the gear wheel 118 via the bearing pipe 117 mounted on the U-shaped holding member 116.

Figure 3:
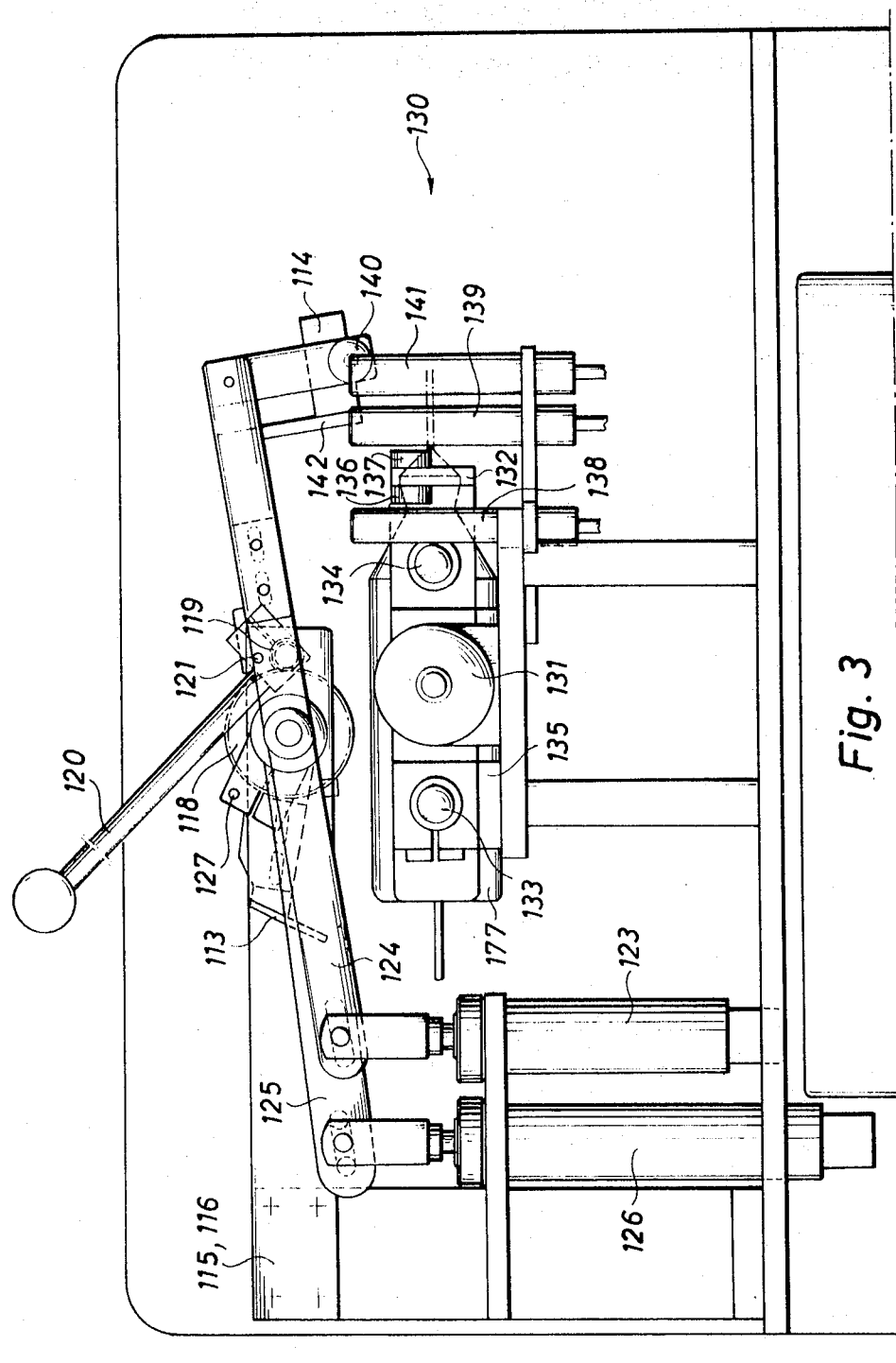
FIG. 3 is a view in the direction of arrows III—III up to the line IV—IV in FIG. 2 on a different scale.

When the work cylinders 123, 126 are pulled in, the front U-shaped stop member 114 is raised and the rear U-shaped stop member 113 is lowered. In order to also lift the rear U-shaped stop member 113 the hand lever 120 is pivoted into the position shown in FIG. 3. If the work cylinder 123 is lifted and the work cylinder 126 is pulled in, the two U-shaped stop members 113 and 114 can be raised and lowered by the hand lever 120. The U-shaped stop members may be adjusted in their length in the direction of the arrow A.

A lateral displacement device 130 has a work cylinder 131, fixedly mounted by its jacket, whose piston rod is secured to an angle piece 132. Guide bars 133 and 134 engage on the angle piece 132 and are displaceably mounted in fixed bearings 135. Magnets 136 and 137 are mounted on the angle piece 132 which co-operate with magnetic switches 138 and 139 which determine the two end positions of the piston rod or of the angle piece 132. A magnet 140 is likewise mounted on an arm secured to the front U-shaped holding member 114, and co-operates with a magnetic switch 141 and only allows the work cylinder 131 to travel out when the front U-shaped stop member 114 is closed and the sensing member 142 connected to it does not rest on a bottle not standing at the rear U-shaped stop member 113.

Figure 4:
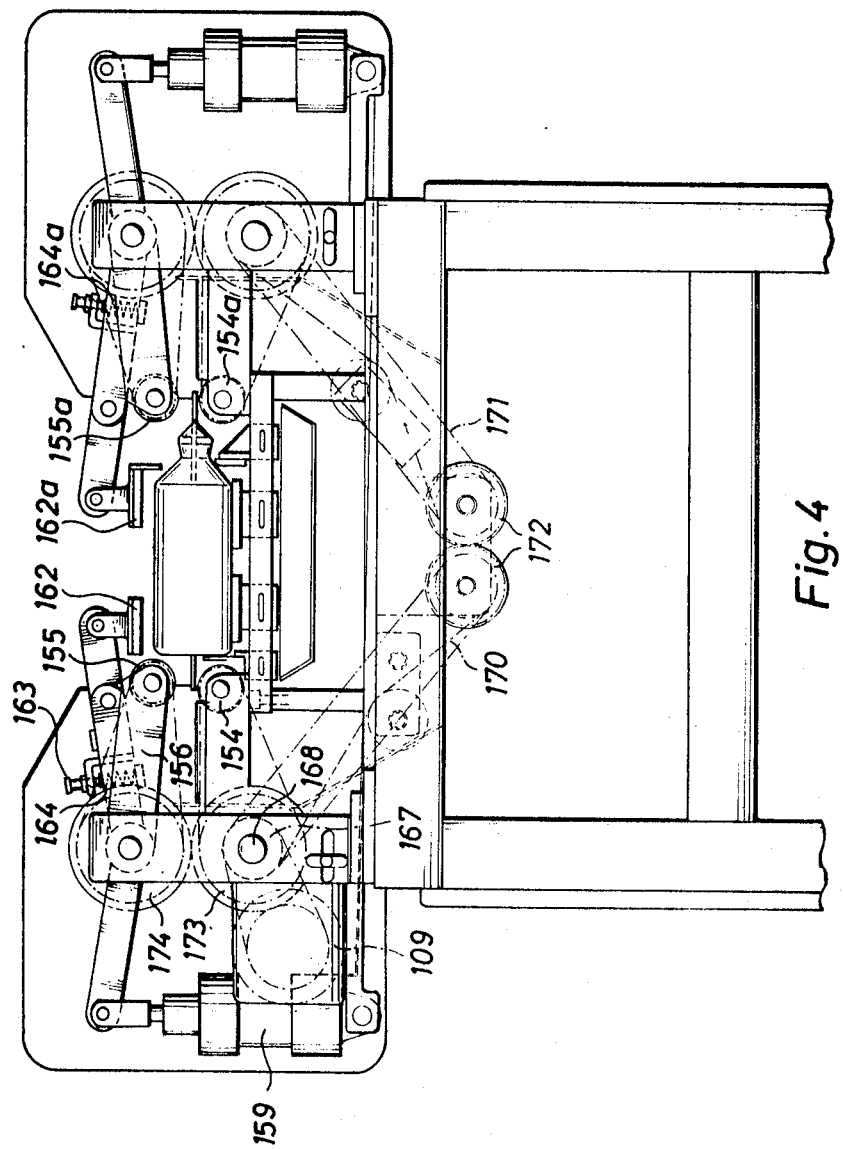
FIG. 4 is a view in the direction of the arrows IV—IV in FIG. 2 on yet another scale.

A separating device 150 is attached to the conveyor belt 106 in the region of the guide roller 108. (FIGS. 2 and 4.) This has a displacement track having two horizontal displacement plates 151 arranged at the same height as the upper run of the conveyor belt 106 which are laterally limited by means of locating ribs 152 and 153. For greater clarity the parts 151 to 153 are only shown on the end of the conveyor belt 106 remote from the separating device 150.

Separating rollers 154 and 154a mounted in fixed bearing blocks are provided laterally of the locating ribs 152 and 153 and co-operate with pivotal separating rollers 155 and 155a. Each of the separating rollers has a spiral shaped projection 177a which co-operates with a similar projection but arranged in mirror image of the associated separating roller. The separating roller 155 is rotatably mounted on a pivotable lever 156, which in turn is adapted to pivot on a fixed axle. A pivotal lever 58 engages on the pivotal axle 157 which can be pivoted by means of a work cylinder 159.

A pair of bearing levers 160 is fixed connected to the pivotal axle 157 on which holding down levers 161 are pivotally mounted, which carry holding down jaws 162 pivotally articulated thereon. Each bearing lever 160 is connected to the holding down lever 161 associated with it via a transmission spring 164 adjustable as to its tension by means of a screw 163.

The corresponding parts of the separating device 150 shown on the right carry the same reference numbers with the addition of a small letter a, and in accordance with the shape of the bottle a greater distance apart is present between the pair of separating rollers 154a and 155a and the holding down jaws 162a that between the corresponding parts on the other side.

The drive for the separating rollers 154, 155 is transmitted by the chain wheel 109 to the chain wheel 167 which drives a shaft 168 on whose opposite end a gear wheel 169 is fixedly mounted. The drive of the gear wheel 169a on the opposite side of the separating device 150 takes place via two chains 170 and 171 which are fixedly connected to one another via a pair of gear wheels 172. The chains 170 and 171 are adapted to be tensioned in the normal manner by means of chain tensioners. A gear wheel 173 is mounted on the shaft 168 and meshes with a gear wheel 174 mounted on the pivotal axle 157. Each of the gear wheels 173, 174 is connected to a gear wheel 175 which is connected to a gear wheel 176 of smaller diameter by means of a toothed belt 177. The gear wheel 176 is fixedly connected to the shaft of the separating roller 155. The pairs of separating rollers 154, 155 and 154a, 155a are thus so driven that the movement of the positions adjacent each other of the separating rollers of one pair is directed from the centre outwardly.

A heat deformable tube 81 passes continuously out of the nozzle of the extruder head 63 and consists of thermoplastic synthetic material, for example, polyethylene. The wheels 52 and 52a meshing with one another drive the chains at a speed which corresponds to the speed at which the plastic tube 81 passes out of the extruder head. The half moulds 12, 12a carried by the carriers 11, 11a running at the same speed are led together below the extruder head 63 and under the pressure of springs compensating for any play are form-locked to one another. On the leading together of a pair of half moulds the tube is squashed together and welded at its lower end. As soon as the half moulds 12, 12a are closed, the tube located in the production mould is shaped, by means of excess pressure acting within and/or vacuum acting from without, into a container, particularly a bottle 177b. The conical seat 69 is placed when the head shaped halves are open, into the neck part of the later container with interposition of the tube on the upper side of the half moulds 12, 12a and moves with these halves, and returns shortly before the formation of a production mould by mutual application of a pair of half moulds, into its initial position and repeats this during the continuance of the operation. Filler liquid is introduced into the container by means of the filling pipe 70. The filling pipe dips into the container to the region of the base thereof. After the container is filled with a pre-determined amount of filler material, after return of the conical seat 69 to its initial position, the head parts 13 and 13a of the mould are closed and a source of low pressure applied for the formation of the head of the container.

On opening of the half moulds, the container, produced, filled and closed is held in the left hand half mould by means of the peg 95 and is carried along with it. In case the form-lock between the peg and container is insufficient, the displacement roller 96 serves to hold the container in the left hand half mould. The container is then passed by this half mould along the metal slide 98 and falls from the end thereof onto the conveyor belt 106. In case the peg 95 does not release the container, the constantly rotating stripper roller 101, with its resilient vanes, provides for the certain removal of the container from the half mould. Whilst it does not follow from FIG. 1 that, in the embodiment described by way of example only, three containers are simultaneously produced filled and closed in one pair of half moulds and deposited on the conveyor belt 106, this emerges from FIG. 2 where, for example the containers 177b are shown lying adjacent one another. These containers have on their base and on their head waste parts or so-called clots resulting during the production process due to the parts of the plastic tube located between the production moulds, which are removed in the separating device 150. During the stationary operation during which usable bottles are produced, the latter first come to rest at the lowered front U-shaped stop member 114, whilst the conveyor belt 106 constantly moves further. As soon as the work cylinder 131 of the separating device has returned to its initial position shown in the drawing, the U-shaped stop member 114 is pivoted upwardly by means of the work cylinder 123 and the container comes to rest at the rear U-shaped stop member 113 which is in the lowered position. The front U-shaped stop member 114 then pivots into its lowered position. When this position is assumed, a signal is produced by the magnet 140 in the magnetic switch 141 which serves to operate the work cylinder 131. The piston rod of this cylinder travels out and the angled piece 132 pushes the bottles into the separating device 150. In the end position of the angled piece 132 the piston of the work cylinder 131 returns therein by means of a signal of the magnet 137 and reports its returned position by a signal from the magnet 136. Thereafter the work cylinders 159 and 159a are operated which press the separation rollers 155 and 155a against their associated rollers 154 or 154a, a waste part lying therebetween. This waste part is gripped between the spiral shaped projections 177, 177a of the two rollers and separated from the bottles at subsequent stations. In order that the bottles retain their position and are not drawn over the locating ribs 152 or 153, the holding down members 162 and 162a, on downward movement of the separating rollers 155, 155a, place themselves under the action of springs 164 or 164a, on the bottles, ensure their position and likewise check the strength of the weld seam of the bottle.

After separation of the waste parts from the bottles, the separating rollers 155, 155a and the holding down jaws 162 and 162a are raised. As soon as they have reached their upper position, the bottles lying in front of the rear U-shaped stop member 113 and pushed into the separating device 150 by means of the work cylinder 131 and the bottles located therein are pushed away on the slide track 151 to the side from whence the bottles fall into a receptacle or onto a conveyor belt.

Should a bottle lying in front of the front U-shaped stop member take up an undesired position, then the senser 142 cannot fully sink. For this reason the magnet 140 cannot produce a signal and the lateral displacement device 130 does not come into operation. At the same time the rear stop member is raised and the bottles can pass out freely to the rear. To deal with the stoppage, the rear U-shaped stop member 113 is raised by means of the hand lever 120 so that the bottles previously resting at this U-shaped member are conveyed further by the conveyor belt and discharged. The front U-shaped stop member 114 lifts simultaneously with the rear one 113, so that three new bottles are conveyed further and held up by the rear U-shaped stop member 113 which has sunk in the meantime when the front U-shaped stop member 114 has also reached its lowered position, the lateral displacement device 130 can come into operation in the manner described.

The U-shaped stop members 113 and 114 are also raised by the hand lever 120 on starting up the device as long as no regular, filled and closed bottles are produced from the extruded plastic tube. The U-shaped stop members 113 and 114 are only lowered and operated in the manner described above by means of the work cylinders 123 and 124 after the machine is in the stationary state and produces bottles of the desired shape and condition.

What I claim is:

1. An apparatus for the production of thermoplastic containers each from a pair of production mold half sections mounted for movement between a mold closing position along one direction and a mold opening position, said section pairs being arranged for movement away from one another at the commencement of said mold opening position about turning radii, comprising:

a discharge means for the removal of each container from said sections, comprising means maintaining each container in one of each of said pair of half sections during the initial mold opening position of each of said pair of half sections, and a guide plate for supporting each said maintained container within said one of said pair of half sections in its mold opening position as it is tilted during its movement along one of said turning radii;

conveyor means including a conveyor disposed at a predetermined elevation adjacent said discharge means and so arranged for conveying each said maintained container, after having been deposited thereon by said discharging means, in the direction of the longitudinal axis of each said maintained container;

separating means, disposed at the same elevation as said conveyor, for simultaneously removing the waste material from the head and bottom of each container remaining after production thereof; and means disposed laterally to said conveyor for shifting each said container into said separating means transversely to their longitudinal axes for removal of the waste material therefrom, said shifting means being operatively interconnected with said conveyor means and with said separating means, and said shifting means serving also to shift each of the waste material removed containers beyond said separating means in the direction of movement of said shifting means as additional containers are shifted into said separating means for removal of the waste material therefrom.

2. The apparatus according to claim 1 wherein said maintaining means comprises a peg on one wall of each said one of said pair of half sections projecting inwardly thereof, and a drive displacement roller disposed substantially at the point of separation of said section pairs from one another.

3. The apparatus according to claim 1 wherein said discharge means further comprises stripper means for engaging each said maintained container to insure its removal therefrom, said stripper means being disposed near the end of said one turning radii of said one of said pair of half sections.

4. The apparatus according to claim 3, characterised in that, said stripper means comprises a constantly driven roller having resilient substantially tangential outwardly projecting lamellae secured thereto.

5. The apparatus according to claim 1 wherein said separating means includes pairs of separating rollers each arranged along opposite ends of the container to be shifted therebetween, one of said rollers of each pair having a spiral-shaped projection thereon, a hold down member associated with each said pair, one of said rollers of each said pair and their respective hold down members each being pivotally supported, and said one roller being supported against its respective hold down member by means of an adjustable spring.

6. The apparatus according to claim 1 wherein said lateral shifting means includes a front and a rear U-shaped stop member each opening in the direction of conveyance of said conveyor belt and each being disposed substantially at the same elevation as said separating rollers and above said conveyor belt, each of said stop members being operable independently from one another, said front stop member serving as a stop for an approaching container from said shifting means, and said rear stop member serving as a stop for the approaching container lying near said separating means, said shifting means further including a pusher for pushing containers from said conveyor to and in between said separating roller pairs.

7. The apparatus according to claim 6 wherein a pivotal lever and an entrainer are provided for each said stop member which is connected to said lever by said entrainer, said levers being interconnected with a hand lever mounted on one of them to permit said stop members to be operated simultaneously.

8. The apparatus according to claim 7, characterised by a signal emitter being provided on the front U-shaped stop member which gives an operating signal only for the operation of the control appliance for said lateral displacement means as soon as said front U-shaped stop member has reached its operational position lying against said conveyor belt.

9. The apparatus according to claim 8 wherein said front member is provided with a sensing rib along the inner surface thereof so as to sense the correct position of a container by permitting said front member to reach its operational position.

10. The apparatus according to claim 1 wherein said lateral shifting means includes a pusher guided by a pair of guide bars, one end of said pusher having an angle piece mounted thereon at one leg thereof, the other leg of said angle piece extending along the length of said pusher, control magnets mounted on said other leg, and magnetic switches disposed near said other leg to be operated by said magnets during shifting movement of said pusher to indicate the extended and retracted position of said angle piece.

11. The apparatus according to claim 1 wherein said separating means is adapted to be driven via said conveyor means from said shifting means.

12. The apparatus according to claim 5 wherein a toothed belt is provided for driving each pair of said rollers, a driving wheel for each said belt being located at a distance from said rollers, each said driving wheel being fixedly connected to a gear wheel which meshes with a corresponding gear wheel arranged for the drive of one of said separating rollers, a chain wheel for driving said conveyor belt with which said gear wheels are interconnected, said drive wheel located at a distance from said rollers being arranged coaxially with the pivot of said pivotally supported rollers.

References Cited
UNITED STATES PATENTS

| | | | |
|---|---|---|---|
| 3,417,428 | 12/1968 | Rupert | 18—5 BS |
| 3,464,084 | 9/1969 | Thompson | 18—5 BS |

HANSEN A. KILBY, Jr., Primary Examiner

U.S. Cl. X.R.

18—4 C, 5 BQ; 425—387, 388, 436, 455